Figure 8:
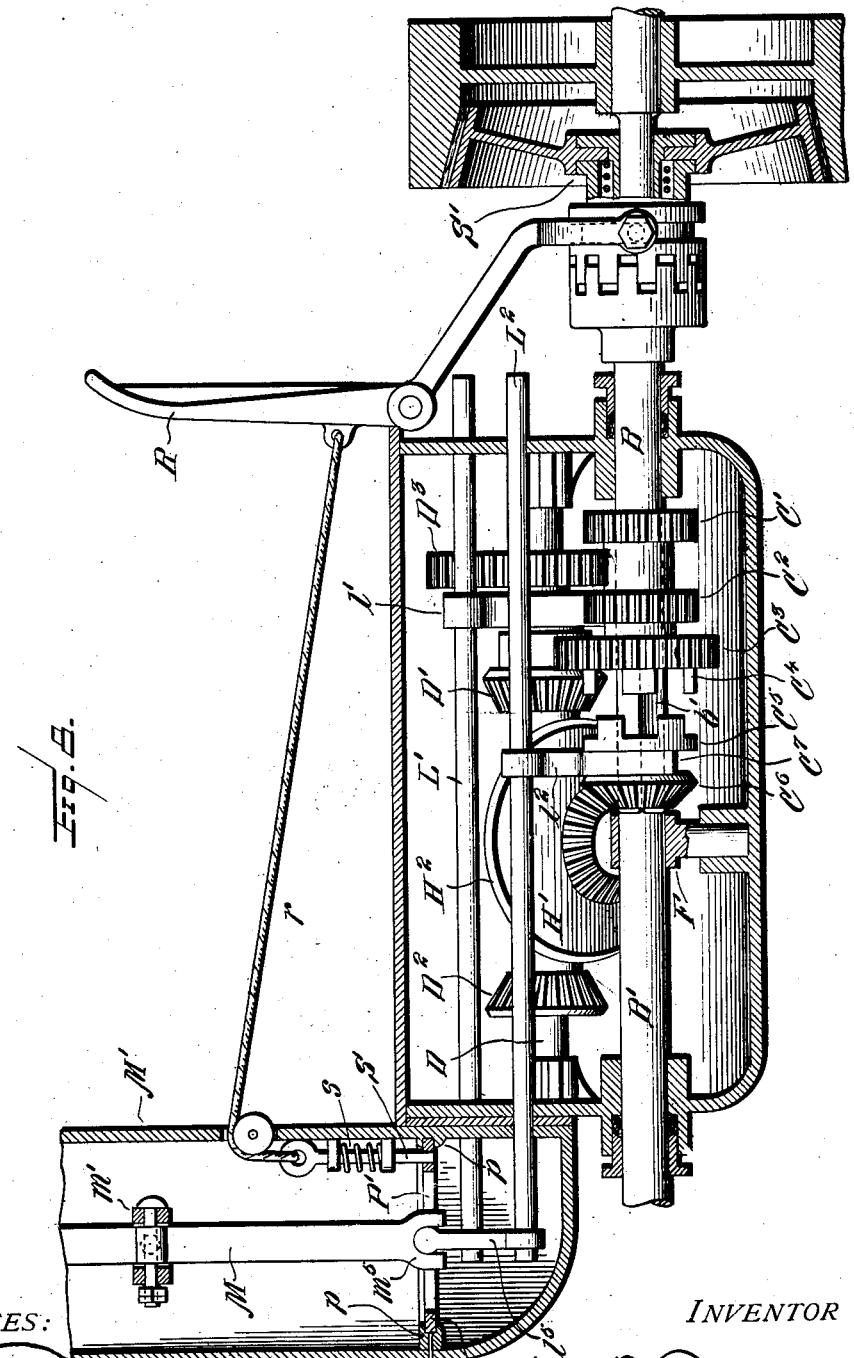

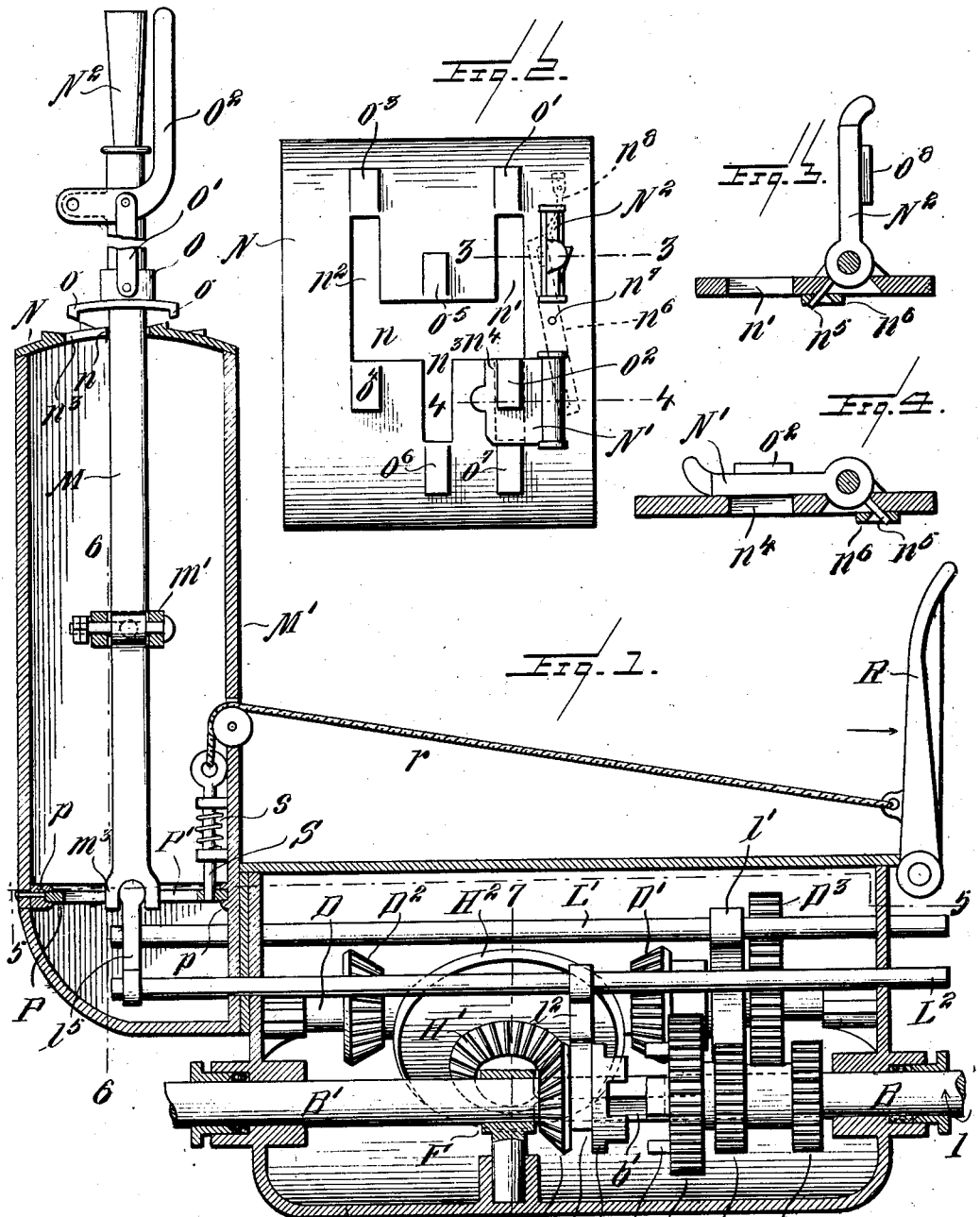

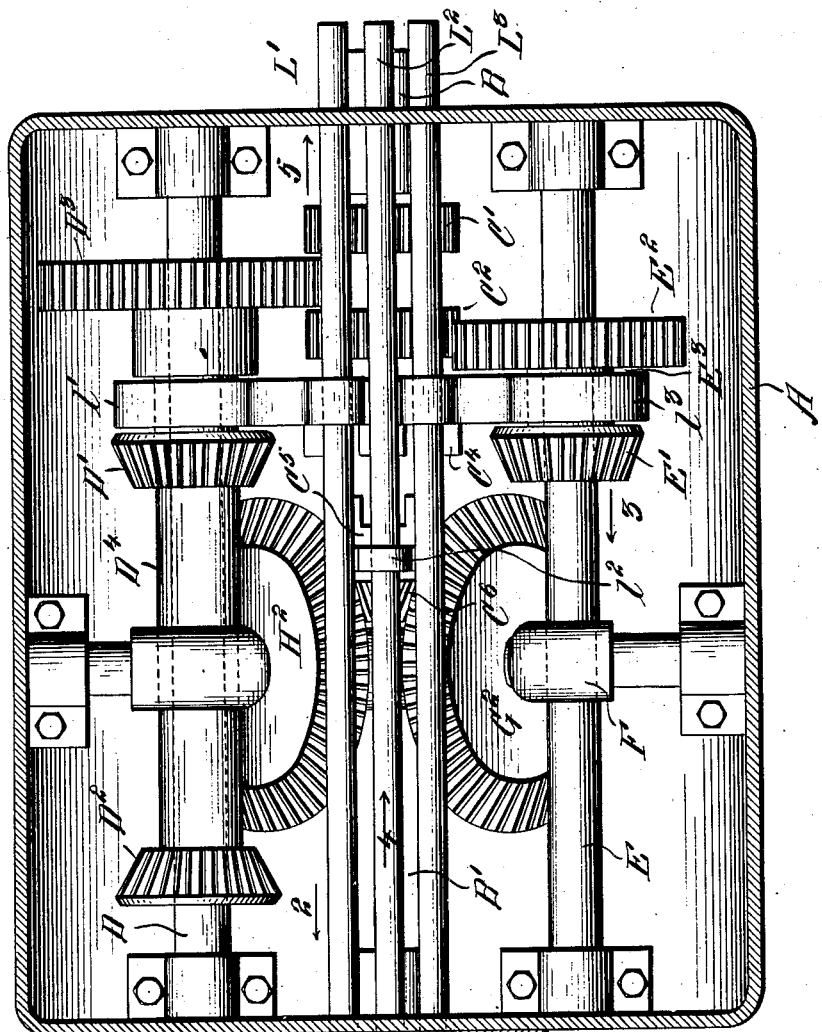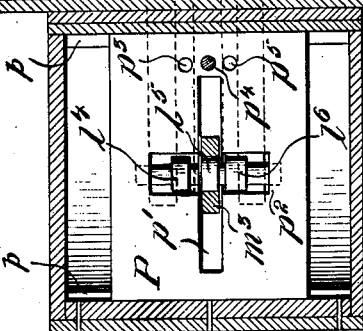

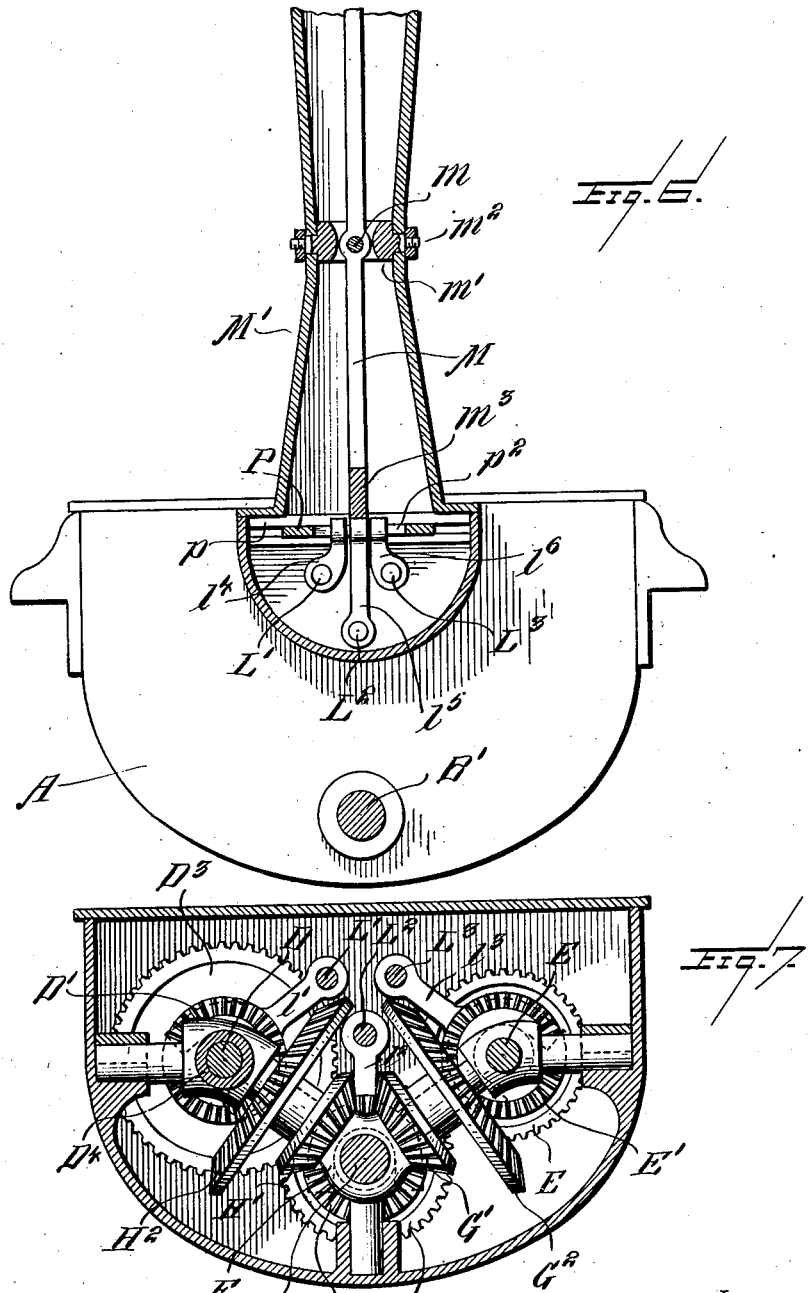

H. T. COLDWELL.
SPEED CONTROLLING AND REVERSING APPARATUS.
APPLICATION FILED JAN. 6, 1908.

902,559.

Patented Nov. 3, 1908.
4 SHEETS—SHEET 4.

WITNESSES:

INVENTOR
Harry T. Coldwell
BY
Attorneys.

UNITED STATES PATENT OFFICE.

HARRY T. COLDWELL, OF NEWBURGH, NEW YORK.

SPEED-CONTROLLING AND REVERSING APPARATUS.

No. 902,559.　　　Specification of Letters Patent.　　Patented Nov. 3, 1908.

Application filed January 6, 1908.　Serial No. 409,501.

*To all whom it may concern:*

Be it known that I, HARRY T. COLDWELL, a citizen of the United States, residing at Newburgh, in the county of Orange and State of New York, have invented certain new and useful Improvements in Speed-Controlling and Reversing Apparatus for Motor-Vehicles; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one form in which I have contemplated embodying my invention, and said invention is fully disclosed in the following description and claims.

Referring to the said drawings, Figure 1 is a sectional view of a speed controlling and reversing apparatus for motor vehicles, embodying my invention. Fig. 2 is a plan view of the guiding plate for the shifting lever, shown in Fig. 1. Fig. 3 is a detail sectional view on line 3—3 of Fig. 2. Fig. 4 is a similar sectional view on line 4—4 of Fig. 2. Fig. 5 is an enlarged horizontal section on line 5—5 of Fig. 1. Fig. 6 is a vertical transverse sectional view on line 6—6, Fig. 1. Fig. 7 is a similar section on line 7—7, Fig. 1. Fig. 8 is a view similar to Fig. 1 showing the main or engine clutch and the connections between it and the transmission gearing, and clutch lever.

My present invention relates particularly to an improved hand lever control mechanism and connected parts, for use with a change speed and reverse gearing of any desired type in which a plurality of devices are to be moved to effect the desired changes of speed, or reverse, and it is here shown in connection with the special form of change speed and reverse gearing shown, described and claimed in my former application filed Dec. 24, 1907 and given Serial No. 407,955. In said application the herein described lever control mechanism is shown and claimed in combination with said change speed and reverse gearing but is not claimed specifically therein. In this application the change speed and reverse gearing is not claimed.

In the drawings A represents a gear case suitably supported in the vehicle and containing the change speed and reversing gearing, which as here shown is that disclosed in my prior application before referred to, although the control lever mechanism herein claimed is applicable to other forms of gearing.

Referring briefly to the particular change speed and reversing gearing herein shown, and which in its specific structure forms no part of my present invention, B, B' represent the main drive shaft, of which the section B is the driving member and is connected to the engine by the usual clutch S, (see Fig. 8) the part B' extending to and being suitably connected with the axle by a differential gear or otherwise in any suitable manner.

The driving section B is provided with pinions $C'$, $C^2$, gear $C^3$ and clutch member $C^4$ all of which are rigidly secured to the shaft section and shaft section B' is provided with a sliding casting mounted on a squared part $b'$ of the shaft, and comprising the clutch member $C^5$ and beveled pinion $C^6$. At each side of and slightly above the shaft B, B' are stationary rods or shafts D and E, held firmly in the casing and arranged parallel with the shaft B, B'. On shaft D is slidably mounted a loose sleeve $D^4$ carrying the reversely beveled pinions $D'$, $D^2$ and gear wheel $D^3$, and on the shaft E is a slidable loosely mounted sleeve $E^3$ provided with bevel pinion $E'$ and gear wheel $E^2$. A part F which I term a "saddle" extends across the gear casing, and is provided with angularly disposed shaft portions, and bearing apertures through which the shaft section B', the shaft E and sleeve $D^4$ extend. The shaft portions of the saddle carry on one side of the main shaft, connected bevel pinion and gear $G'$, $G^2$ and on the opposite side connected bevel pinion and gear $H'$, $H^2$, the pinions $G'$, and $H'$ being adapted to mesh with the bevel pinion $C^6$ on main shaft section B'.

For conveniently shifting the movable parts of the transmission mechanism, I employ preferably three sliding rods $L'$, $L^2$, $L^3$ each of which is provided with a suitable yoke. The yoke $l'$ of rod $L'$ engages the sleeve $D^4$, the yoke $l^2$ of the center rod $L^2$ engages the casting $C^7$, and the yoke $l^3$ of rod $L^3$ engages the sleeve $E^3$.

The transmission mechanism as herein shown and described provides for driving the driven shaft section B' in one direction at three different speeds, and for driving in the reverse direction at one speed only. These changes of gearing are accomplished in the following manner. To drive at the lowest speed forward or in the same direction as the driving section or member B, (which will be supposed to rotate in the direction indicated by the arrow 1 in Fig. 1,) the slide rod $L'$ is operated so as to move the sleeve $D^4$ in the direction of the arrow 2, Fig. 5, thus bringing gear wheel $D^3$ into mesh with pinion $C^2$, and forcing beveled pinion $D'$ into mesh with the beveled gear $H^2$. The motion will then be imparted from driving shaft section B, through the reducing train comprising wheels $C^2$, $D^3$, $D'$, $H^2$, $H'$ to bevel pinion $C^6$, on the driven section $B'$, which will be rotated in the same direction as the driving member B, but at lower speed.

To secure an intermediate speed, the parts previously mentioned are restored to normal position by rod $L'$ and rod $L^3$ is shifted to bring the gear $E^2$ into mesh with the gear $C^3$, and bevel pinion $E'$ into mesh with bevel gear $G^2$ (see arrow 3) thus connecting the shaft section B through an intermediate reducing train including wheels $C^3$, $E^2$, $E'$, $G^2$, $G'$ with bevel pinion $C^6$, and driving shaft $B'$ in the same direction as shaft B, but slower. This train gives an increased speed, however, over the first mentioned train.

To drive the shaft section $B'$ at highest speed the parts just mentioned are restored to normal position by rod $L^3$, and the central rod $L^2$ is shifted, to move the sleeve or casting $C^7$ in the direction of arrow 4, thus moving bevel pinion $C^6$ out of gear with bevel pinions $H'$ and $G'$ and bringing the members $C^4$, $C^5$ of the clutch together. This causes the two shafts to move together in the same direction and at the same speed. It is to be noted that when the shaft $B'$ is driven at highest speed, none of the other pinions or gear wheels are in operation, and all useless wear upon them is thus prevented.

In order to reverse the shaft $B'$, the rod $L'$ is moved in a direction opposite to that previously described, so as to shift the sleeve $D^4$ in the direction of the arrow 5, and bring gear $D^3$ into mesh with pinion $C'$, and bevel pinion $D^2$, in mesh with bevel gear $H^2$, thus transmitting motion at reduced speed and in reverse direction to the pinion $C^6$, which will have been restored to its normal position in mesh with pinions $H'$, $G'$.

At some suitable point in the vehicle I arrange a vertically disposed lever M which is pivoted between its ends universally. In this instance I have shown, (Figs. 1 and 6) said lever mounted on a pivot $m$ in a block $m'$ having horizontal trunnions $m^2$ extending perpendicularly to the pivot $m$ and engaging apertures in a suitable supporting casing $M'$, to which they are secured by nuts as shown, thus enabling the upper end of the lever to be moved both laterally and back and forward. Each of the rods $L'$, $L^2$, $L^3$ (or extensions thereof) is provided with a vertically extending arm or lug having its upper end rounded or partly cylindrical, the said lugs being shown at $l^4$, $l^5$, $l^6$, and being connected to rods $L'$, $L^2$, $L^3$ respectively. The lower end of lever M is provided with a yoke $m^3$ of a width equal to or less than that of one of said lugs, so that either one of the three lugs may be selected by means of said lever, by moving it laterally while a backward or forward movement of the lever will actuate one only of said rods, to wit, the one selected, longitudinally.

At the upper end of the casing $M'$ is a guiding and indicating plate N curved concentrically with the trunnions $m^2$, and provided with a transverse slot $n$, from the opposite ends of which two slots $n'$ $n^2$ extend forwardly, while from the center a slot $n^3$ extends rearwardly, and an additional slot $n^4$ extends rearwardly in line with the slot $n'$ (see Fig. 2). The slot $n'$ indicates the position of the lever M for the first, or slowest speed, slot $n^2$ the position of the lever for the second or intermediate speed, slot $n^3$ the position for high speed and slot $n^4$ the position for the reverse. When the lever is in any part of the transverse slot $n$, its position is neutral, and no gears are engaged, and it is so illustrated in Fig. 1. In order to prevent the operator from pulling the lever out of slot $n'$, directly into reverse by accident, I provide a lock-out plate $N'$ pivoted to the plate N at one side of the slot $n^4$ and having its forward edge in line with the rear edge of slot $n$. This lock-out plate is normally held in the position shown, as hereinafter described. A similar lock-out plate $N^2$ is provided for the first speed slot $n'$, and means are provided for connecting said lock-out plates so that when one is down in operative position, the other is always raised. In this instance I have shown the hinge member of each lock-out plate (Figs. 2, 3 and 4) provided with a downwardly extending stud $n^5$, extending through a slot in the plate N, and said studs engage slots in the opposite ends of a lever $n^6$, pivoted at $n^7$ below said plate N, thus securing the result described. A spring $n^8$ bearing against said lever $n^6$, holds it normally in the position shown in the drawings. The lever M is provided with a vertically movable collar O, provided with locking pawls $o\ o$ extending forwardly and rearwardly therefrom to engage suitable detents provided in connection with plate N, so that the lever M can be locked in any position to which it may be moved, against accidental displacement. The collar O is connected by a link $O'$ with a pawl lever $O^2$ arranged adjacent to the hand portion $N^2$ of lever M so that the pawls $o\ o$ can be raised when the handle is grasped.

The detents referred to are arranged as follows: A detent $o'$ being at the outer end of slot $n'$, for locking the lever into first speed, and a detent $o^2$ on top of lock-out plate N' to lock the lever on coming out of said slot. A detent $o^3$ is located at the outer end of slot $n^2$ and a detent $o^4$ adjacent to its inner end, detent $o^5$ and $o^6$ at opposite ends of slot $n^3$, a detent $o^7$ at the outer end of slot $n^4$ for the reverse and a coöperating detent $o^8$ on the lock-out plate $N^2$. I also provide means for positively preventing the operation of any of the rods L', $L^2$, $L^3$ except the one selected. At the lower end of the casing M' I arrange a laterally movable plate P, mounted in guides $p$ $p$ extending transversely of the rods L', etc., and provided with a longitudinal central slot $p'$ (see Fig. 5) just wide enough to permit the movement therethrough of the yoke $m^3$, and one of the lugs on the gear shifting rods. Plate P is also provided with a lateral slot $p^2$ which embraces the heads of all of said lugs $l^4$, $l^5$, $l^6$ and is, therefore, too narrow to admit the yoke $m^3$. The slot $p^2$ is of sufficient length to accommodate two of the lugs $l^4$, $l^5$, $l^6$ on each side of the longitudinal slot $p'$. I also provide means for preventing the shifting of the lever M laterally, to change the speed of the gearing, until after the ordinary clutch, with which all motor vehicles are provided, has been disconnected. In this instance R represents the foot lever controlling the clutch S' between the engine and shaft B which lever is moved by the foot of the operator in the direction of the arrow, Figs. 1 and 8, to disconnect the clutch, thus disconnecting the engine or motor from shaft B. The clutch lever is moved in the direction to throw the clutch in by a spring (not shown) as usual in such cases.

The plate P is provided with a series of holes $p^3$, $p^4$, $p^5$, arranged in a transversely disposed line beneath a locking bolt S, preferably pressed downwardly by a spring $s$ into engagement with one or the other of the holes in the plate P and said bolt is connected by a chain $r$, or other connection with clutch lever R. It follows from this construction that when the lever M has been moved into position to select a particular speed, the application of the clutch will permit the bolt S to enter one of the holes in the plate P and lock it and lever M against lateral movement. The lever cannot, thereafter be shifted laterally until the operator presses the clutch lever R forward, thereby releasing the bolt S from plate P.

The operation of the parts described will be as follows. Supposing that the operator desires to start a car from a standstill, the clutch being disconnected, he seizes the handle of lever M and throws it to the right into line with slot $n'$, then forward into said slot where it will be locked by releasing the pawl lever $O^2$. As the lever M is moved to the right its lower end will move to the left, carrying with it plate P, until the yoke $m^3$ engages lug $l^4$ of the rod L'; the forward movement of the handle causes the lug $l^4$ and rod L' to move rearwardly (the lugs $l^5$ and $l^6$ being locked in the right hand part of slot $p^2$, and held from movement). This draws the sleeve $D^4$ in the direction of the arrow 2, as before described and sets the train for the lowest or first speed. After starting the car and gaining momentum, the operator can by throwing out the clutch go to second speed, or directly to the third or highest speed, as preferred, by throwing out the clutch, moving the handle laterally to slot $n^2$ or slot $n^4$ and forward or rearward as required by the slots, the yoke $m^3$ of lever M selecting the required rod and moving it in the required direction. In going to reverse the operator must first throw up the lock-out plate N', thus throwing down the plate $N^2$, when a lateral and rearward movement of the hand lever will put the reverse gearing in operative relation.

It will be seen that each time a gear train is selected and put into operative condition, all parts are restored to inoperative or normal position by simply throwing the hand lever back to the neutral position in slot $n$, before any other speed can be selected. Again in throwing the lever M out of geared position it will be instantly stopped in the neutral position by the opposing edge of slot $n$ or by one of the lock-out plates N', $N^2$ as will be readily understood.

The operator is free at all times to select any of the speeds, or reverse, and proceed directly to it without "passing through" other gear connections thus rendering the control extremely elastic. Again the distance that the hand lever M is moved from neutral to "in gear" position is a very short one, not exceeding two or three inches, so that the changes can be made very quickly and without taking the attention of the operator from the steering wheel or causing him to lean materially in any direction.

What I claim and desire to secure by Letters Patent is:—

1. In a controlling device for motor vehicles, the combination with a plurality of separate gear shifting devices having actuating parts arranged side by side, of a single operating hand lever, movable laterally and back and forth, a part of said lever being constructed to engage one of said actuating parts only at a time, a locking device for positively locking said lever in operative relation with the selected actuating device, and means independent of the movements of said lever, for releasing the said locking device to permit the lateral shifting of the lever, substantially as described.

2. In a controlling device for motor vehicles, the combination with a plurality of separate gear shifting devices having actuating devices arranged side by side, of a single operating hand lever, pivoted so as to be capable of swinging movement laterally and also backward and forward, the lower end of said lever being constructed to engage one only of said actuating devices, a transversely movable locking plate provided with a slot engaging the lower end of said lever and permitting the longitudinal movement of the lever, with respect to said plate, said plate having transversely disposed slots engaging the actuating devices not selected and holding them from movement, a locking device for said plate, and a lever operatively connected with said locking device for releasing the plate, whereby said hand lever cannot be shifted laterally from one actuating device to another without releasing said locking device, substantially as described.

3. In a controlling device for motor vehicles, the combination with a plurality of separate gear shifting devices having actuating parts arranged side by side, of a single operating hand lever, movable laterally and back and forth, a part of said lever being constructed to engage one of said actuating parts only at a time, a locking plate, movable laterally with said lever, and constructed to permit the back and forth movement of the lever at all times, a locking device, for positively locking said plate, to hold the lever in engagement with a selected shifting device, and means independent of the movements of said hand lever for releasing said locking device to permit the lateral shifting of the hand lever, substantially as described.

4. In a controlling device for motor vehicles, the combination with a plurality of separate gear shifting devices having actuating parts arranged side by side, of a single operating hand lever, movable laterally and back and forth, a part of said lever being constructed to engage one of said actuating parts only at a time, a locking plate mounted to slide laterally with said lever, and constructed to permit the back and forth movements of the lever at all times, said plate having a plurality of locking apertures corresponding to the series of shifting devices, a stationary locking bolt for engaging the locking apertures in said plate, and a separate lever for operating said bolt, substantially as described.

5. In a controlling device for motor vehicles, the combination with a plurality of separate gear shifting devices having actuating devices arranged side by side, of a single operating hand lever, pivoted so as to be capable of swinging movement laterally and also backward and forward, the lower end of said lever being constructed to engage one only of said actuating devices, a plate provided with a laterally disposed slot and longitudinally disposed slots engaging the upper end of said hand lever, two of said longitudinal slots being in line on opposite sides of the laterally disposed slot, lockout devices for closing said opposed slots, and connections between said lockout devices constructed to effect the closing of either of said slots when the other is open, substantially as described.

6. In a controlling device for motor vehicles, the combination with a plurality of separate gear shifting devices having actuating devices arranged side by side, of a single operating hand lever pivoted so as to be capable of swinging laterally and also backward and forward, the lower end of said lever being constructed to engage one only of said actuating devices, a locking plate, movable with said lever in a direction to shift the lever from one to another of said actuating devices, a locking device for said plate for positively locking said lever in engagement with the selected actuating device, and connections between said locking device and the clutch lever of the motor vehicle, for releasing said locking device and the locking plate, when the clutch is thrown out of operative position, substantially as described.

7. In a controlling device for motor vehicles, the combination with a plurality of separate gear shifting devices having actuating devices arranged side by side, of a single operating hand lever pivoted so as to be capable of swinging laterally and also backward and forward, the lower end of said lever being constructed to engage one only of said actuating devices, a locking plate movable with said lever in a direction to shift it from one to another of said actuating devices, said locking plate having means for holding the lever in engagament with the selected actuating device, and having also means for locking the actuating devices not selected against movement, a locking device for locking said plate in position to hold the lever in engagement with any one of the actuating devices, and connections between said locking device and the clutch lever for releasing said locking plate only when the clutch is thrown out of operative position, substantially as described.

In testimony whereof I affix my signature, in the presence of two witnesses.

HARRY T. COLDWELL.

Witnesses:
 EDWIN T. SMITH,
 E. C. ROSS.